(12) United States Patent
Kawakami

(10) Patent No.: US 8,246,029 B2
(45) Date of Patent: Aug. 21, 2012

(54) CLAMP DEVICE

(75) Inventor: Takayuki Kawakami, Hyogo (JP)

(73) Assignee: Pascal Engineering Corporation, Hyogo (JP)

( * ) Notice: Subject to any disclaimer, the term of this patent is extended or adjusted under 35 U.S.C. 154(b) by 109 days.

(21) Appl. No.: 12/735,627

(22) PCT Filed: Jan. 22, 2009

(86) PCT No.: PCT/JP2009/000236
§ 371 (c)(1),
(2), (4) Date: Aug. 3, 2010

(87) PCT Pub. No.: WO2009/101765
PCT Pub. Date: Aug. 20, 2009

(65) Prior Publication Data
US 2010/0327503 A1 Dec. 30, 2010

(30) Foreign Application Priority Data
Feb. 15, 2008 (JP) ................. 2008-034921

(51) Int. Cl.
*B23Q 3/00* (2006.01)
*B23Q 1/00* (2006.01)
*B23Q 3/08* (2006.01)
*B23Q 17/00* (2006.01)
*B25B 1/20* (2006.01)
*B25B 1/14* (2006.01)
*B25B 5/12* (2006.01)

(52) U.S. Cl. ............ 269/310; 269/49; 269/24; 269/37; 269/32; 269/28; 269/228; 29/407.01

(58) Field of Classification Search ............... 269/309, 269/310, 24, 27, 28, 228, 289 R, 32
See application file for complete search history.

(56) References Cited

U.S. PATENT DOCUMENTS

| 3,456,955 A | 7/1969 | Bruinsma |
| 6,095,509 A * | 8/2000 | Yonezawa ................. 269/309 |

(Continued)

FOREIGN PATENT DOCUMENTS

DE 40 20 981 1/1992

(Continued)

OTHER PUBLICATIONS

U.S. Appl. No. 12/735,626, Takayuki Kawakami, filed Aug. 3, 2010.

(Continued)

*Primary Examiner* — Monica Carter
*Assistant Examiner* — Nirvana Deonauth
(74) *Attorney, Agent, or Firm* — Jordan and Hamburg LLP

(57) ABSTRACT

A clamp device includes an annular grip member capable of being inserted into an hole in a workpiece and of gripping the inner circumferential surface of the hole, a clamp rod having a tapered shaft portion fitted inside the grip member and engaged therewith, a hydraulic cylinder capable of axially advancing and retracting the grip member and the clamp rod, and a clamp main body member. The clamp device is provided with seating surfaces formed upon the clamp main body member, on which the workpiece is seated, and a poor clamping detection mechanism that detects poor clamping, in the state in which the grip member is driven in its clamping direction by the hydraulic cylinder via the clamp rod, and the workpiece is in its state of being seated upon the seating surfaces.

8 Claims, 9 Drawing Sheets

U.S. PATENT DOCUMENTS

| | | | |
|---|---|---|---|
| 6,944,927 B2 * | 9/2005 | Nakamura | 29/407.01 |
| 6,976,671 B2 | 12/2005 | Migliori | |
| 6,988,720 B2 | 1/2006 | Kawakami | |
| 2005/0121846 A1 | 6/2005 | Kawakami | |
| 2009/0315239 A1 | 12/2009 | Yonezawa et al. | |

FOREIGN PATENT DOCUMENTS

| | | |
|---|---|---|
| JP | 11-188551 | 7/1999 |
| JP | 2004-195583 | 7/2004 |
| JP | 3550010 | 8/2004 |
| JP | 3-106769 | 1/2005 |
| WO | WO-2007/060986 | 5/2007 |
| WO | WO-2007/074737 | 7/2007 |

OTHER PUBLICATIONS

U.S. Appl. No. 12/736,493, Takayuki Kawakami, filed Oct. 13, 2010.

* cited by examiner

CLAMP DEVICE

TECHNICAL FIELD

The present invention relates to a clamp device that clamps a workpiece by engaging a grip claw of a grip member into a hole in the workpiece and pulling the workpiece against a seating surface, and that is provided with a poor clamping detection means that detects poor clamping.

BACKGROUND OF THE INVENTION

In a case where machining processing is performed over all the surfaces of a workpiece, a clamp device as described above (so called hole clamp device) is employed, since it is not possible to employ a clamp device of the type that presses from above on an end portion of the workpiece with a pressing implement. With such a clamp device, a seating surface is formed on a body member, and the workpiece to be the object of clamping is seated on the seating surface. When the workpiece is to be loaded, the workpiece is mounted on the seating surface and is supported thereupon, and a grip member and a clamp rod having a tapered shaft portion inserted into the grip member are inserted into a hole in the workpiece. And next, after increasing the diameter of a grip claw with the tapered shaft portion and engaging it against the inner circumferential surface of the hole by driving the clamp rod in a retraction direction and pulling it towards the seating surface, the workpiece is fixed against the seating surface by further pulling the grip member towards the seating surface. Clamp devices like the one described above are disclosed in Patent Documents #1 and #2.

Now, generally, often a seating sensor is provided to the clamp device, in order, when fixing a workpiece with the clamp device, to detect whether or not the workpiece has been fixed in the state of being correctly seated to the expected seating surface. This seating sensor comprises a pressurized air ejection hole that opens to the seating surface, an air supply passage that supplies pressurized air to the pressurized air ejection hole, a pressure switch that detects whether the air pressure within the air supply passage has risen to at least a predetermined pressure.

Patent Document #1: Japanese Patent No. 3,550,010 Publication

Patent Document #2: German Patent No. 4,020,981 Publication

Since the seating sensor only detects that the workpiece has seated against the seating surface, this does not limit the workpiece to being fixed with the predetermined clamping force, even though seating of the workpiece against the seating surface has been detected by the seating sensor. For example, in the case of the above described hole clamp device, when during clamping the clamp rod is driven in its retraction direction for clamping and the grip claw portion of the grip member is forced by the tapered shaft portion of the clamp rod to expand and to bite into the inner circumferential surface of the hole in the workpiece, sometimes it may happen that the grip claw portion slips relative to the hole in the workpiece, although the workpiece maintains its state of being seated against the seating surface. In particular, if the workpiece is a cast product, and if the hole therein is formed as a slightly tapering aperture, then slipping of the grip claw portion can easily occur.

If this type of slipping of the grip claw portion has occurred, then the workpiece comes to be clamped with a clamping force that is remarkably decreased, since the piston member of the fluid pressure cylinder shifts to retract as far as its limit retraction position. However it is not possible to detect the above type of poor clamping with the seating sensor, since even in this case the workpiece is held seated upon the seating surface. If machining of the workpiece is performed while it is held with this type of poor clamping, then there is the problem that the cutting tool may suffer damage or the workpiece may suffer damage, since the workpiece may be pushed away from its proper position by the cutting force from the cutting tool acting upon it.

SUMMARY OF THE INVENTION

The object of the present invention is to supply a clamp device capable of reliably detecting poor clamping in the state in which a workpiece is seated on the seating surface.

The clamp device according to the present invention comprises an annular grip member capable of expanding and shrinking in a radial direction and of being inserted into a hole in a workpiece and of gripping an inner circumferential surface of the hole, a clamp rod having a tapered shaft portion that is fitted into and engaged with the grip member, a fluid pressure cylinder for driving the grip member and the clamp rod forwards and backwards in an axial direction, and a main body member to which the grip member, the clamp rod, and the fluid pressure cylinder are attached, and is characterized by comprising: a seating surface formed on the main body member for seating the workpiece; and a poor clamping detection means for detecting poor clamping in a state where the grip member is driven by the fluid pressure cylinder via the clamp rod in the direction parallel to an axis of the clamp rod, and the workpiece is seated on the seating surface.

When a workpiece is to be clamped, and when the grip member is driven in its retraction direction by the fluid pressure cylinder via the clamp rod so that the workpiece is seated on the seating surface, the poor clamping detection means detects poor clamping in the state in which the workpiece is seated.

According to the clamp device of the present invention, this clamp device comprises the annular grip member capable of being inserted into a hole in a workpiece and of gripping the inner circumferential surface of the hole, the clamp rod that has the tapered shaft portion fitted into and engaged with the grip member, the fluid pressure cylinder for driving the grip member and the clamp rod forwards and backwards in the axial direction, and the main body member to which the grip member, the clamp rod, and the fluid pressure cylinder are attached.

Since this clamp device includes the seating surface formed on the main body member for seating the workpiece, and the poor clamping detection means that detects poor clamping in a state in which the grip member is driven in the clamping direction by the fluid pressure cylinder via the clamp rod and the workpiece is seated upon the seating surface, accordingly, when the workpiece is clamped, with the poor clamping detection means, it is possible to detect poor clamping in a situation in which the workpiece is seated on the seating surface. It should be understood that poor clamping includes an imperfectly clamped state such as one in which sufficient clamping force is not generated. Since it is possible to detect poor clamping as described above, accordingly, along with preventing poor clamping, it is also possible to prevent damage to the tool and also damage to the workpiece.

In addition to the structure of the present invention as described above, it would also be acceptable to arrange to employ various further structures, as follows.

(1) A co-operating member may be provided that shifts integrally with the grip member in the direction parallel to an axis of the fluid pressure cylinder; and the poor clamping detection means may comprise a valve mechanism that is actuated by the co-operating member to open when the grip member has been shifted to its limit position in the clamping direction or to a position in the vicinity thereof, an air passage that supplies pressurized air to the input side of the valve mechanism, and a pressure switch that detects that the pressure of pressurized air in the air passage is greater than or equal to a predetermined pressure value. According to this structure, with a simple structure, it is possible to implement a poor clamping detection means that operates reliably.

(2) A co-operating member may be provided that shifts integrally with the grip member in the direction parallel to the axis of the fluid pressure cylinder; and the poor clamping detection means may comprise a pressurized air ejection hole that is sealed by the co-operating member when the grip member has been shifted to its limit position in the clamping direction or to a position in the vicinity thereof, an air passage that supplies pressurized air to the pressurized air ejection hole, and a pressure switch that detects that the pressure of pressurized air in this air passage is greater than or equal to a predetermined pressure value. According to this structure, with a simple structure, it is possible to implement a poor clamping detection means that operates reliably.

(3) A seating sensor may be provided that includes a pressurized air ejection hole opening to the seating surface. According to this structure, it is possible to detect seating of the workpiece on the seating surface with the seating sensor.

(4) When the grip member is driven in the clamping direction by the fluid pressure cylinder via the clamp rod, and when the grip member has slipped with respect to the inner circumferential surface of the hole in the workpiece, the grip member may shift to its limit position in the clamping direction. According to this structure, with the poor clamping detection means, it is possible to detect poor clamping when the grip member has slipped with respect to the inner circumferential surface of the hole in the workpiece.

(5) There may be further provided a passage portion that branches off from the air passage of the poor clamping detection means, and a seating sensor including a pressurized air ejection hole that communicates with the passage portion and moreover opens to the seating surface. According to this structure, it is possible to standardize the greater portion of the air passage of the poor clamping detection means and the seating sensor, and moreover it is possible to standardize the detection portions of the poor clamping detection means and the seating sensor.

(6) The valve mechanism may comprise a valve member that opens and closes the air passage, and an elastic valve biasing member that biases the valve member to a position to close the air passage; and the valve member may be pushed by the co-operating member so as to be operated to open. According to this structure, with the valve biasing member which is elastic, it is possible reliably to bias the valve member to its position to close the air passage.

(7) The valve mechanism may comprise a valve member that opens and closes the air passage, and a rod shaped valve biasing member that is installed in the main body member so as to be movable, and that, upon receipt of fluid pressure supplied to the fluid pressure cylinder, biases the valve member to a position to close the air passage; and in that the valve member is operated to open by being pushed by the co-operating member. According to this structure, the hydraulic pressure supplied to the fluid pressure cylinder is used effectively for biasing the valve member, and it is possible reliably to detect poor clamping and also to enhance the durability of the valve mechanism.

(8) The valve mechanism may comprise a valve member that opens and closes the air passage, and a rod shaped valve biasing member that is inserted into a piston of the fluid pressure cylinder so as to shift freely therein, and that, upon receipt of fluid pressure supplied to the fluid pressure cylinder, biases the valve member to a position to close the air passage; and the valve biasing member may be adapted, when the piston has shifted to its limit position in the clamping direction, to be able to be engaged with the piston portion and to shift the valve member to a position to open the air passage. According to this structure, the hydraulic pressure supplied to the fluid pressure cylinder is used effectively for biasing the valve member, and it is possible reliably to detect poor clamping and moreover to enhance the durability of the valve mechanism.

DESCRIPTION OF NUMERALS

Figure 1:
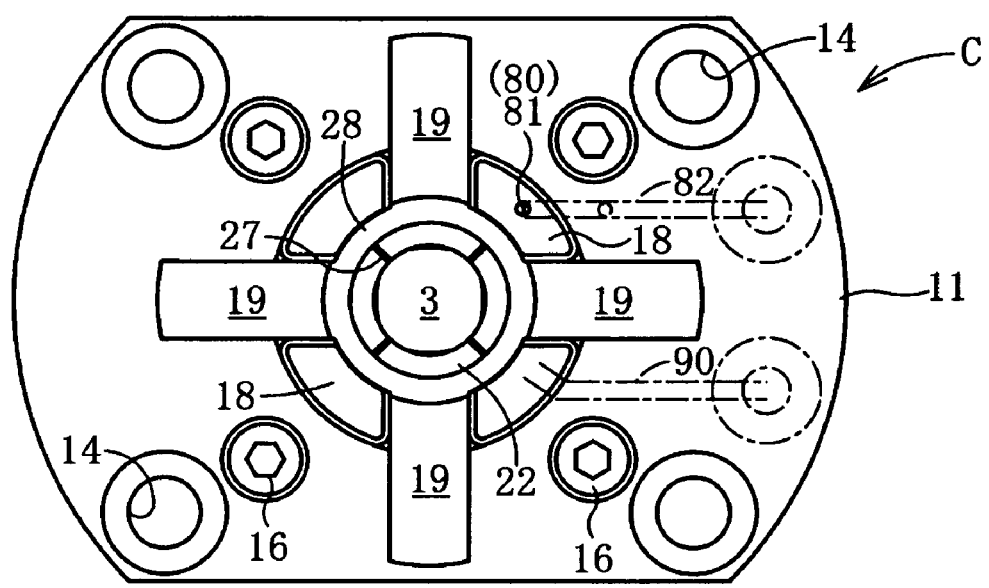
FIG. 1 is a plan view of a clamp device according to an embodiment of the present invention.

W: workpiece
H: hole
C, CA, CB, CC, CD, CE, CF: clamp devices
1: main body member
2, 2F: grip members
3: clamp rod
4: hydraulic cylinder
5: annular pressure receiving member
18: seating surfaces
22, 161: workpiece mounting surfaces
23: annular guard portion
24: grip claw portion
26: base end guard portion
28: scraper 31: tapered shaft portion
41: cylinder bore
42: piston member
44: tubular piston rod
45: clamping hydraulic chamber
46: unclamping hydraulic chamber
52: O-ring
80: seating sensor
81: pressurized air ejection hole
100, 100A, 100B, 100D, 100E: poor clamping detection mechanisms
104, 83: air passages
84: pressure switch
105, 105D, 105E: valve mechanisms
120: pressurized air ejection hole
121~124: air passages
125: pressure switch
130: pressurized air ejection hole
131~133: air passages
134: pressure switch Description of the Preferred Embodiments In the following, best modes for implementation of the present invention will be explained on the basis of embodiments.
Embodiment 1

Figure 2:
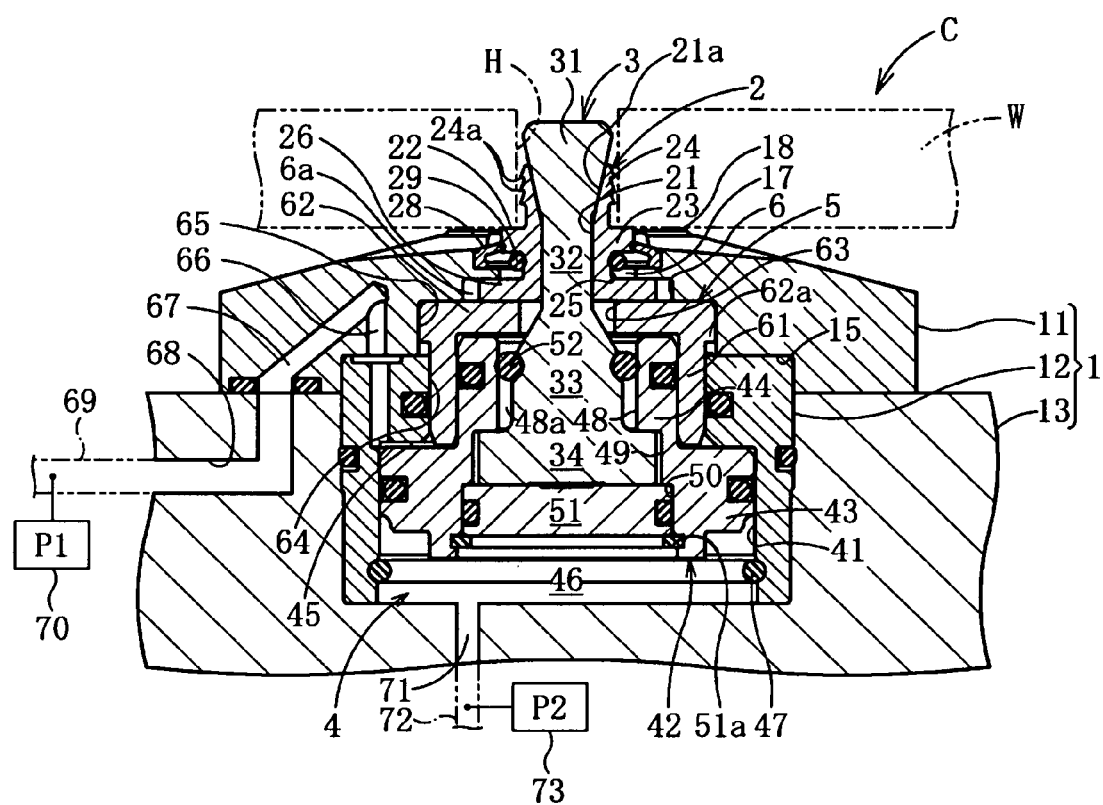
FIG. 2 is a vertical sectional view of the clamp device (workpiece loaded state) of FIG. 1.
Figure 3:
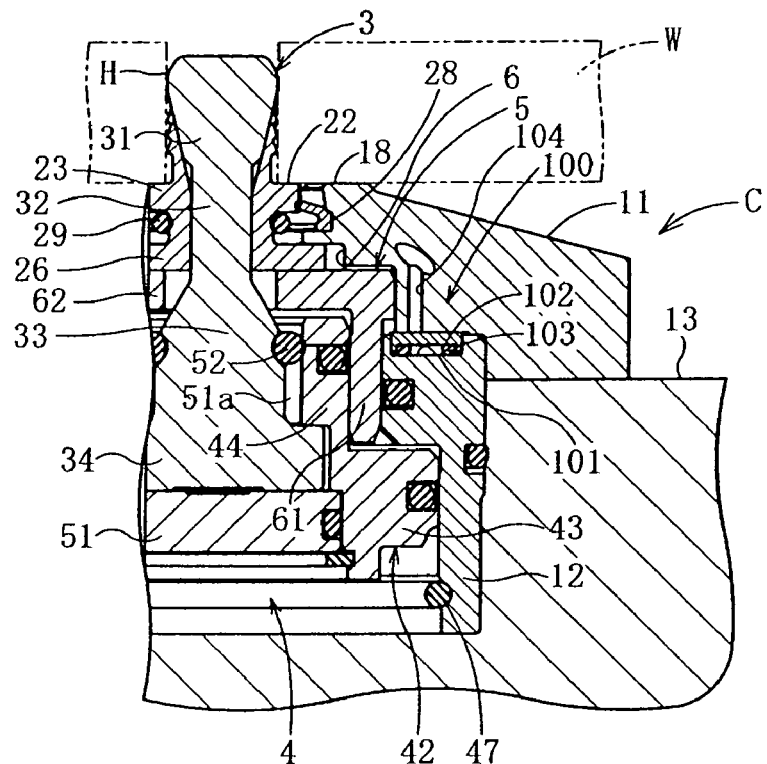
FIG. 3 is a partial vertical sectional view of the clamp device (clamped state) of FIG. 1.

As shown in FIGS. 1 through 3, this clamp device C comprises a clamp main body member 1, a grip member 2 for fixing a workpiece W, a clamp rod 3, a hydraulic cylinder 4 (i.e. a fluid pressure cylinder) that can drive the grip member 2 and the clamp rod 3 in the axial direction (the vertical direction), and an annular pressure receiving member 5 that is included in the hydraulic cylinder 4. The main body member 1 consists of an upper main body member 11, a lower main body member 12, and a base body member 13.

The upper main body member 11 has an almost elliptical shape as seen in plan view, and this upper main body member 11 is fixed to the base body member 13 by four bolts that are inserted into four bolt holes 14. And the lower main body member 12 is a tubular member in which a cylinder bore 41 is formed, with the upper end portion of this lower main body member 12 being fitted into a concave portion 15 on the lower end of the upper main body member 11, and being fixed to the upper main body member 11 by four bolts 16.

As shown in FIGS. 1 through 3, the grip member 2 is provided so as to pierce vertically through an aperture 17 in the center portion of the upper main body member 11. Seating surfaces 18 consisting of four circular arc shapes surrounding the grip member 2 are defined on the upper surface of the upper main body member 11, and, in the state in which the workpiece W is clamped, the workpiece W can be seated against these seating surfaces 18. Four concave grooves 19, through which pressurized air may flow and be blown, are formed upon the upper surface of the upper main body member 11 in the shape of a + sign. Except for the four seating surfaces 18 and the four concave grooves 19, the upper surface of the upper main body member 11 is formed as a portion of a conical surface having a gentle angle of slope.

The grip member 2, which is shaped approximately as a sleeve, is made so that it can be expanded and shrunk down in the radial direction, and moreover is inserted into a hole H in the workpiece W and is capable of gripping the inner circumferential surface of the hole H. This grip member 2 comprises: a rod insertion hole 21; a workpiece mounting surface 22 that, when the grip member 2 is in an advanced position (i.e. an upper limit position) in which it is shifted towards the workpiece W, can receive and stop the workpiece W in a position that is more advanced than the seating surfaces 18 (i.e. is above them); an annular guard portion 23 on which the workpiece mounting surface 22 is defined; a grip claw portion 24 that extends from the annular guard portion 23 in the advance direction; a base end guard portion 26 that is formed on the end opposite to the grip claw portion 24 with respect to the annular guard portion 23; and an annular groove 25 that is formed between the annular guard portion 23 and the base end guard portion 26. The annular guard portion 23, the grip claw portion 24, the annular groove 25, and the base end guard portion 26 of the grip member 2 are separated into four equal parts in the circumferential direction by slits 27. The grip member 2 comprises four separated grip members.

The grip member 2 is made as a metallic member, and teeth 24a are formed in three stages on the outer circumferential surface of the four divided claw portions of its grip claw portion 24, so as to be able easily to grip the inner circumferential surface of the hole H in the workpiece W. And the rod insertion hole 21 is formed in the grip member 2, into which the clamp rod 3 is inserted and through which it passes. The portion of this rod insertion hole 21 that corresponds to the grip claw portions is formed as a tapered hole portion 21a into which a tapered shaft portion 31 of the clamp rod 3 is engaged so as to fit closely.

As shown in FIGS. 1 through 3, a scraper 28 that is made from an elastic material such as rubber or synthetic resin is installed in the aperture 17 of the upper main body member 11, and is slidable in contact against the outer circumferential surface of the annular guard portion 23 of the grip member 2. And an O-ring 29 is installed in the annular groove 25 of the grip member 2, and biases the separated grip claw portions 24 and the annular guard portion 23 in the direction of radial reduction.

The base end guard portion 26 of the grip member 2 is contained in a concave circular portion 6 of the upper main body member 11, and is installed in a state of being sandwiched between an upper wall portion of the concave circular portion 6 and a horizontal plate portion 62 of the annular pressure receiving member 5. An annular gap 6a is formed in the interior of the concave circular portion 6, outside the base end guard portion 26. The grip member 2 is installed so that it can be raised and lowered integrally together with the annular pressure receiving member 5, and moreover so that, by the elastic deformation of the scraper 28 and the annular gap 6a, it can be shifted in horizontal directions orthogonal to the axis of the hydraulic cylinder 4.

The clamp rod 3 comprises the tapered shaft portion 31, a small diameter rod portion 32 that extends downward from the lower end of the tapered shaft portion 31, a large diameter rod portion 33 that continues downward from the lower end of the small diameter rod portion 32, and a large diameter guard portion 34 that continues downward from the lower end of the large diameter rod portion 33, all formed integrally together. The tapered shaft portion 31 and the small diameter rod portion 32 are inserted through the rod insertion hole 21 of the grip member 2. The above described tapered shaft portion 31 is formed at the upper end portion of the clamp rod 3 so that its diameter increases in the upward direction, and this tapered shaft portion 31 is fitted into the tapered hole portion 21a of the grip member 2 and is engaged therewith.

As shown in FIGS. 1 through 3, the hydraulic cylinder 4 is a device for driving the grip member 2 and the clamp rod 3 forwards and backwards (up and down) along their axial direction. This hydraulic cylinder 4 comprises a cylinder bore 41 that is formed in the lower main body member 12 and the base body member 13 in a vertical orientation, a piston member 42 that is installed in the cylinder bore 41, a tubular piston rod 44 that is integral with the piston member 42 and extends upwards from a piston portion 43 thereof, a clamping hydraulic chamber 45 above the piston portion 43 and a unclamping hydraulic chamber 46 below the piston portion 43, and the annular pressure receiving member 5.

The bottom end of the cylinder bore 41 is blocked by the base body member 13, and a stop ring 47 for regulating the downward shifting of the piston member 42 is installed in an annular groove in a lower portion of the cylinder bore 41 adjacent to its lower end. The piston member 42 is received and stopped at its lower limit position by a stop ring 47. A central hole is formed in the piston member 42, and this central hole is defined by an upper portion small diameter hole 48 that is formed in the tubular piston rod 44, a medium diameter hole 49 at a middle portion, and a lower portion large diameter hole 50. A sealing member 51 is installed in the large diameter hole 50, and the sealing member 51 is retained by a stop ring 51a.

The large diameter rod portion 33 of the clamp rod 3 is positioned within the small diameter hole 48, while its large diameter guard portion 34 is positioned within the medium diameter hole 49. An annular gap 48a of about 2 mm for example is defined between the large diameter rod portion 33 and the inner circumferential surface of the small diameter hole 48, and a thick O-ring 52 (i.e. an elastic ring member) is installed in an annular groove upon the external circumference of the large diameter rod portion 33, with this O-ring 52 being installed in a state of being slightly compressed between the large diameter rod portion 33 and the tubular piston rod 44.

The thickness of the large diameter guard portion 34 is almost equal to the thickness of the medium diameter hole 49. And a slight gap is defined between the outer circumferential surface of the large diameter guard portion 34 and the inner circumferential surface of the medium diameter hole 49. For this reason, while the clamp rod 3 shifts integrally with the piston member 42 to move upwards and downwards, it is also shiftable relatively to the piston member 42 in horizontal directions orthogonal to the axis of the hydraulic cylinder 4, due to elastic deformation of the O-ring 52 and the scraper 28. And the grip member 2 can also shift integrally with the clamp rod 3 in horizontal directions orthogonal to the axis described above. Here, the scraper 28 and the O-ring 52 are an elastic biasing means that elastically biases the grip member 2 and the clamp rod 3, so as to make the common axis of the grip member 2 and the clamp rod 3 coincide with the axis of the hydraulic cylinder 4.

As shown in FIGS. 1 through 3, the annular pressure receiving member 5 comprises a pressure receiving barrel portion 61 and the horizontal plate portion 62 that extends at the upper end of this pressure receiving barrel portion 61. The base end guard portion 26 of the grip member 2 is mounted on the horizontal plate portion 62, and the base end surface of the grip member 2 is supported on the upper surface of this horizontal plate portion 62. The large diameter rod portion 33 of the clamp rod 3 is passed through a circular hole 63 in the center portion of this horizontal plate portion 62 with some free play therebetween, and an engagement guard 62a whose diameter is slightly larger than that of the pressure receiving barrel portion 61 is formed upon the external circumferential portion of the horizontal plate portion 62. And an upper cylinder bore portion 64 is formed in the lower main body member 12, extending at the upper end of the cylinder bore 41 and having a diameter smaller than that of the cylinder bore 41. It should be understood that the annular pressure receiving member 5 corresponds to a "co-operating member" that shifts integrally with the grip member 2 along the axial direction of the hydraulic cylinder 4.

A containment hole 65 is formed in the upper main body member 11, extending at the upper end of the upper portion cylinder bore 64. The thickness of this containment hole 65 is greater than that of the engagement guard 62a, and for example may be 1.2~2.0 mm larger. The pressure receiving barrel portion 61 of the annular pressure receiving member 5 is installed in an annular hole between the inner circumferential surface of the upper cylinder bore portion 64 and the tubular piston rod 44 in a fluid-tight manner and moreover so as to slide freely therein in the vertical direction, and the horizontal plate portion 62 is installed in the containment hole 65 so as to slide freely therein in the vertical direction. It should be understood that a plurality of seal members (not denoted by reference numerals) are provided in order to prevent leakage of hydraulic fluid from the hydraulic chambers 45 and 46. Additionally, "hydraulic pressure" means pressured oil in this specification.

The lower end of the above described pressure receiving barrel portion 61 of the annular pressure receiving member 5 faces into the clamping hydraulic chamber 45 and receives the hydraulic pressure therein. This clamping hydraulic chamber 45 is connected to a hydraulic pressure supply source via hydraulic passages 66 through 69, and furthermore a hydraulic pressure detection sensor 70 is also provided that detects the pressure of hydraulic pressure in the hydraulic passage 69.

And the unclamping hydraulic chamber 46 is connected to a hydraulic pressure supply source via hydraulic passages 71 and 72, and furthermore a hydraulic pressure detection sensor 73 is also provided that detects the pressure of hydraulic pressure in the hydraulic passage 72. The annular pressure receiving member 5 is shiftable along a predetermined stroke in the direction parallel to the axis of the clamp rod 3 between a first position in which the workpiece mounting surface 22 of the grip member 2 is positioned as being advanced more outwards (i.e. upwards) than the seating surfaces 18, and a second position in which the workpiece mounting surface 22 is positioned as being more backwards (i.e. lowered) than the seating surfaces 18.

As shown in FIGS. 1 through 4, a seating sensor 80 is provided that, in the state in which a workpiece W has been clamped, detects that the lower surface of the workpiece W is closely contacted against the seating surfaces 18. This seating sensor 80 comprises a pressurized air ejection hole 81 that opens to one of the seating surfaces 18, an air passage 82 formed in the upper main body member 11 so as to communicate with the pressurized air ejection hole 81 and an air passage 83 formed in the base body member 13, a pressurized air supply source that supplies pressurized air to the air passage 83, and a pressure switch 84 that detects that the pressure of the pressurized air in the air passage 83 has risen to or above a predetermined pressure.

As shown in FIG. 1, an air passage 90 that is similar to the air passage 82 is formed in the upper main body member 11, and pressurized air is supplied from this air passage 90 to the concave circular portion 6 and the annular groove 25, so that this pressurized air flows from the four slits 27 of the grip member 2 to the four seating surfaces 18, and thereby air is blown against the four seating surfaces 18, so that these seating surfaces 18 are cleaned.

Figure 4:
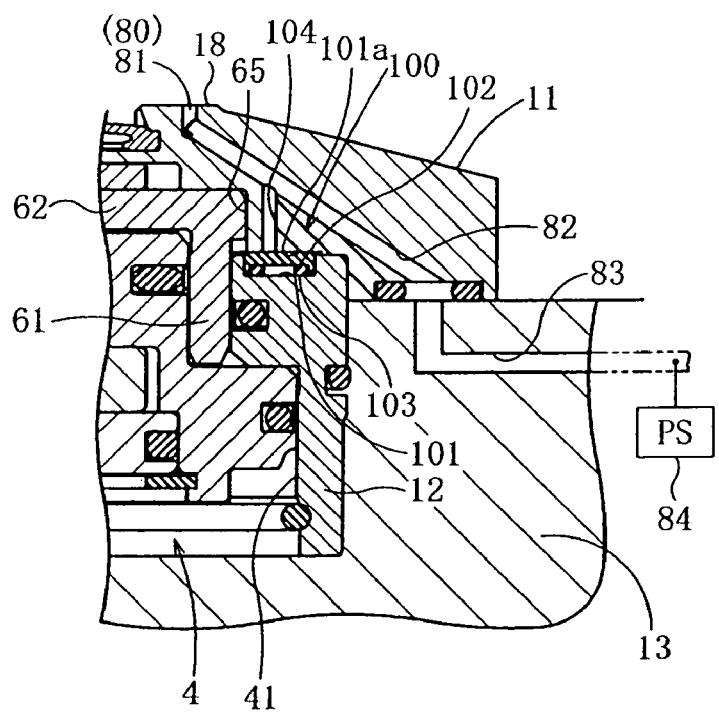
FIG. 4 is a partial vertical sectional view of the clamp device of FIG. 1.
Figure 5:
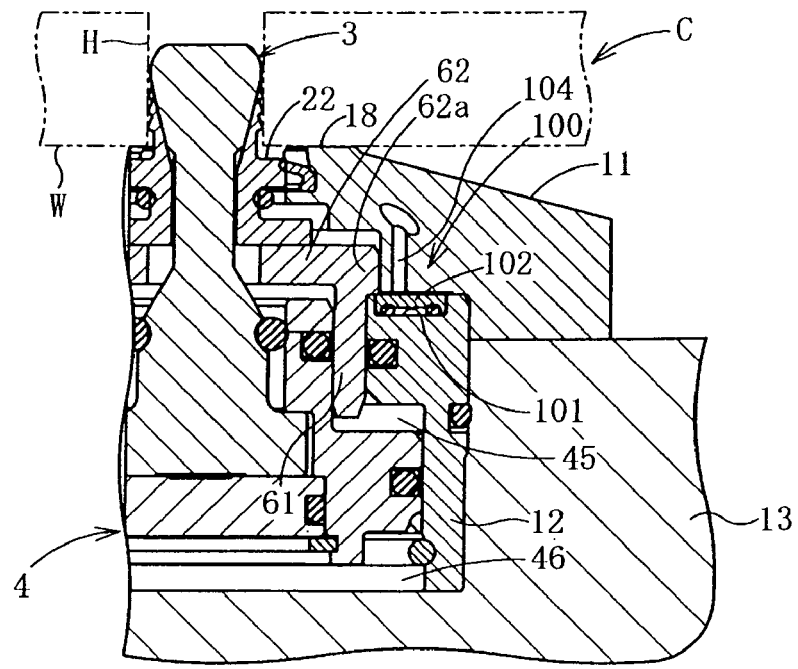
FIG. 5 is a partial vertical sectional view of the clamp device (poorly clamped state) of FIG. 1.
Figure 6:
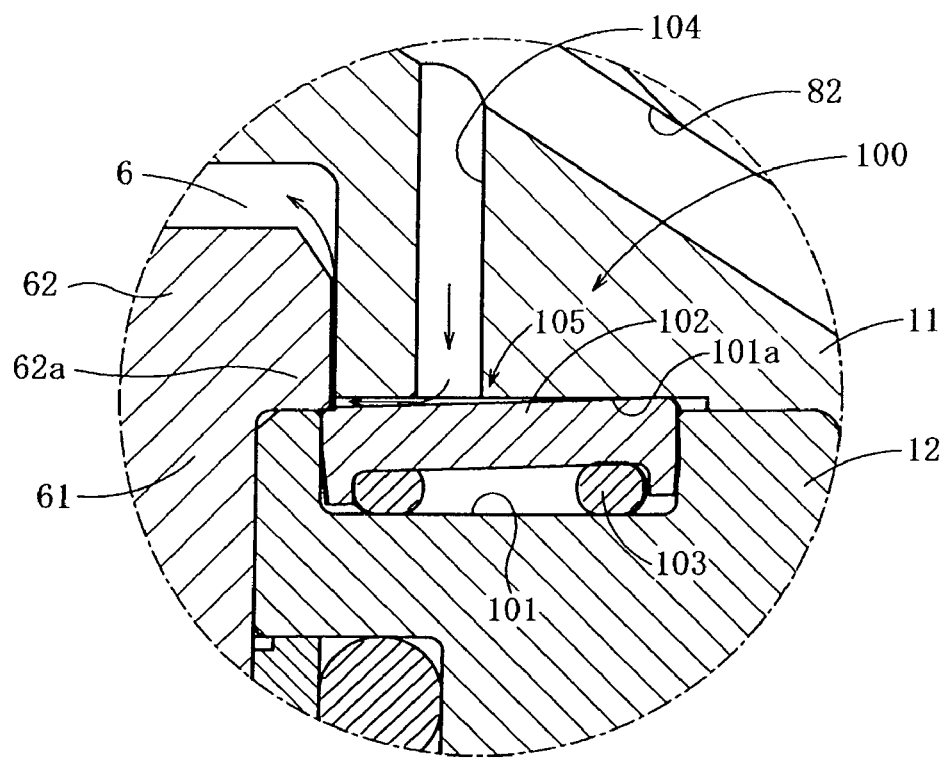
FIG. 6 is an enlarged vertical sectional view showing the essential portions of a poor clamping detection mechanism of the clamp device of FIG. 5.

Next, a poor clamping detection mechanism 100 for detecting poor clamping will be explained. As shown in FIGS. 4 through 6, along with a shallow concave circular portion 101 being formed at the upper end portion of the lower main body member 12 below the above described air passage 82, an extremely shallow concave circular portion 101a is formed upon the lower surface of the upper main body member 11, opposing the concave circular portion 101. A circular valve plate 102 (i.e. a valve member) is received in these concave circular portions 101 and 101a so as to open or close an air passage 104, and an O-ring 103 (i.e. a valve biasing member) is installed below the lower surface of this valve plate 102, so as to bias the valve plate 102 upwards to a position in which it closes the air passage 104. The air passage 104 is formed to extend from the above described air passage 82, and thereby pressurized air is supplied to above the upper surface of the valve plate 102.

Due to the formation of the concave circular portion 101a, when the grip member 2 has been retracted to its lower limit position (its limiting position in the clamping direction) and the annular pressure receiving member 5 has been lowered as far as its lower limit position, the engagement guard 62a of the annular pressure receiving member 5 comes to contact against the valve plate 102 and acts to press the valve plate 102 downwards to its position to open the air passage 104 (refer to FIG. 6). And, in the state in which the annular pressure receiving member 5 is not lowered as far as its lower limit position, the seating sensor 80 operates normally, because the lower end of the air passage 104 is closed by the valve mechanism 105 that includes the valve plate 102 and the O-ring 103. However if, due to poor clamping as will be described hereinafter, the annular pressure receiving member 5 is lowered to its maximum limit and the engagement guard 62a has pressed the valve plate 102 downward, then the valve mechanism 105 is opened and, since the pressurized air in the air passage 104 leaks out to the containment hole 6 and leaks to the aperture 17 from the containment hole 6, accordingly the air pressure in the air passages 82 and 104 ceases to be elevated.

In this manner, even after the clamp operation, by the seating sensor 80 detecting that seating of the workpiece W has not been detected, it is possible to detect poor clamping, as will be described hereinafter. It should be understood that it would also be acceptable to arrange to provide a structure in which the above valve mechanism 105 is opened when the grip member 2 is retracted as far as a position in the vicinity of its limit position in the clamping direction, and the annular pressure receiving member 5 has been lowered as far as a position in the vicinity of its lower limit position.

It should be understood that the hydraulic pressure supply source, the air supply source, the hydraulic pressure detection sensors 70 and 73, and the pressure switch 84 are electrically connected to a control unit not shown in the figure, and are controlled by this control unit.

Figure 7:
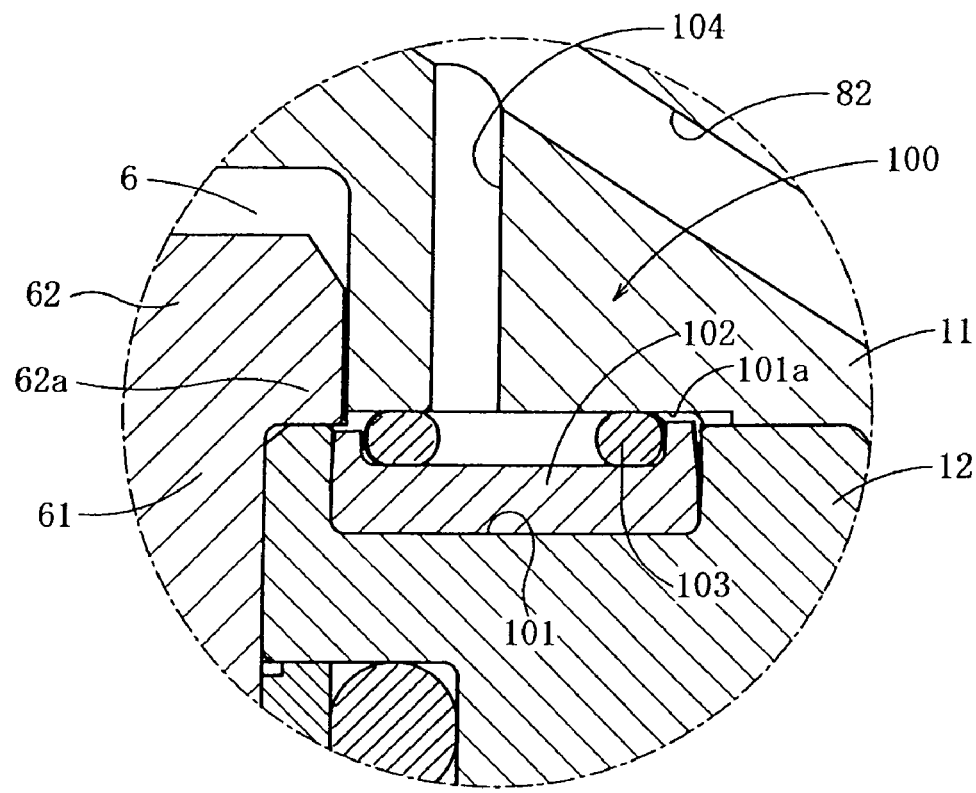
FIG. 7 is an enlarged vertical sectional view showing the essential portions of the poor clamping detection mechanism of the clamp device of FIG. 5 in a state arranged not to function.

Here, if it is not desired to use the function of this poor clamping detection mechanism 100, then it will be acceptable to install the valve plate 102 and the O-ring 103 into the concave circular portions 101 and 101a in the reverse vertical arrangement, as shown in FIG. 7. Since by doing this the upper end of the valve plate 102 is positioned lower than the upper end of the concave circular portion 101 of the lower main body member 12, accordingly, even if the annular pressure receiving member 5 is lowered as far as its lower limit position, still the state in which the air passage 104 is closed by the O-ring 103 is maintained, since the engagement guard 62a of the annular pressure receiving member 5 does not contact against the valve plate 102.

The operation and the advantages of the clamp device C described above will now be explained. When a workpiece W is to be fixed by the clamp device C, first, initially, the hydraulic pressure having almost the same pressure is supplied to the clamping hydraulic chamber 45 and to the unclamping hydraulic chamber 46. When this is done, since the pressure receiving area of the piston member 42 in the unclamping hydraulic chamber 46 is larger than its pressure receiving area in the clamping hydraulic chamber 45, accordingly, as shown in FIG. 2, the piston member 42 is raised up to its upper limit position and remains in the stopped state. Furthermore, the annular pressure receiving member 5 is held in its upper limit position because it experiences the hydraulic pressure in the clamping hydraulic chamber 45, and the grip member 2 is also held in its upper limit position, with the workpiece mounting surface 22 being held in a position slightly higher than the seating surfaces 18.

In this state the workpiece W is loaded and, as shown in FIG. 2, the grip member 2 and the clamp rod 3 are inserted into the hole H of the workpiece W, and the workpiece W is supported by the workpiece mounting surface 22. Since, in this manner, a structure is provided in which first the workpiece W is supported by the workpiece mounting surface 22 which is in a position higher than the seating surfaces 18, and thereafter the workpiece W is supported by the seating surfaces 18 in the clamped state, accordingly it is possible to prevent the seating surfaces 18 from suffering damage due to the workpiece W while the workpiece W is being loaded. Moreover, since it is arranged for the seating sensor 80 not to operate before clamping, but rather for the seating sensor 80 to operate when the workpiece W is seated upon the seating surfaces 18 and has been fixed with the predetermined clamping force, accordingly it is possible to enhance the reliability of the seating sensor 80.

Next, the pressure of hydraulic pressure in the unclamping hydraulic chamber 46 is changed over to a predetermined pressure that is lower than the pressure of hydraulic pressure in the clamping hydraulic chamber 45, so that a quite strong predetermined hydraulic force operates upon the piston member 42 in the downward direction. When this is done, although the annular pressure receiving member 5 which experiences the hydraulic pressure in the clamping hydraulic chamber 45 is held in its upper limit position in a similar manner to that described above and the grip member 2 is also held in its upper limit position. But, the hydraulic pressure operates upon the piston member 42 in the downward direction and the piston member 42 is driven downward, accordingly it shifts downward slightly relatively to the grip member 2.

As a result, the grip claw portion 24 of the grip member 2 is driven by the tapered shaft portion 31 of the clamp rod 3 so that its diameter expands, and bites into the inner circumferential surface of the hole H in the workpiece W and is put into a state of engagement therewith. When, in this state, the hydraulic pressure in the unclamping hydraulic chamber 46 is reduced down to drain pressure, a large hydraulic force in the downwards direction acts upon the piston member 42, and, since it is impossible for the grip member 2 and the clamp rod 3 to shift relatively to one another, accordingly, as shown in FIG. 3, the piston member 42, the grip member 2, the clamp rod 3, and the annular pressure receiving member 5 are driven downwards slightly as one unit, and the workpiece W is seated upon the seating surfaces 18 and stops in the clamped state in which it is pressed strongly thereagainst.

At this time, as shown in FIG. 3, since small gap remains between the engagement guard portion 62a of the annular pressure receiving member 5 and the upper end of the lower main body member 12, accordingly the valve mechanism 105 of the poor clamping detection mechanism 100 is kept in the closed state. For this reason, it is possible to detect with the seating sensor 80 that the workpiece W has been clamped with the predetermined clamping force and has been seated against the seating surfaces 18.

Figure 8:
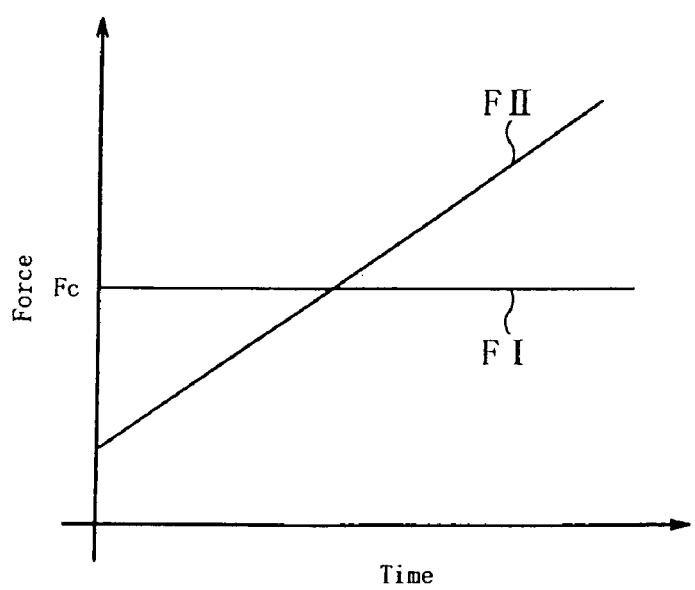
FIG. 8 is a drawing showing a relationship between gripping operation of a workpiece W and clamping operation.

Now, the relationship between the operation by which the grip claw portion 24 of the grip member 2 bites into the inner circumferential surface of the hole H in the workpiece W and the operation of clamping the workpiece W will be explained in detail on the basis of FIG. 8. In FIG. 8, the pressure of hydraulic pressure that is supplied to the clamping hydraulic chamber 45 is denoted by P1, the pressure of hydraulic pressure that is supplied to the unclamping hydraulic chamber 46 is denoted by P2, FI denotes the force in the upwards direction that acts upon the grip member 2 due to the pressure P1, and FII denotes the force in the downward direction that acts upon the clamp rod 3 due to the pressure P1 and the pressure P2.

Although the pressure P1 is kept constant from the start since FI is kept at Fc, and although the pressure P2 decreases after the workpiece W is supported on the workpiece mounting surface 22 and the grip member 2 and the clamp rod 3 have been inserted into the hole H in the workpiece W, at this time FII is applied in the downwards direction upon the clamp rod 3, so that FII increases along with decrease of the hydraulic pressure P2. Here, at least in the state in which FII is lower than Fc, the grip member 20 is not pulled downwards by the clamp rod 3, but rather is subjected to FII from the clamp rod 3 so that its diameter is increased.

And when FII becomes greater than Fc, although the clamping operation starts in which the grip member 2 and the clamp rod 3 are lowered together slightly as one unit, since up to this time the diameter of the grip member 2 is sufficiently increased, since the grip member 2 reliably clamps the workpiece W and it is possible to start the clamp operation in this state, accordingly it is possible reliably to prevent the grip claw portions 24 from slipping relatively downwards with respect to the inner circumferential surface of the hole H in the workpiece W, and reliably to clamp the workpiece W.

Now, if the workpiece W is a cast product, and the diameter of the hole H therein is not constant, but rather it is a hole H that increases in diameter downwards, or if the workpiece W is made from a hard metallic material, then, when the pressure of hydraulic pressure in the unclamping hydraulic chamber 46 reaches drain pressure and the driving downwards of the piston member 42 starts, sometimes it may happen that the grip claw portions 24 may slip relatively downwards with respect to the inner circumferential surface of the hole H.

In this case, as shown in FIGS. 5 and 6, since the annular pressure receiving member 5 is lowered to its lower limit position although the workpiece W is seated upon the seating surfaces 18, accordingly the valve mechanism 105 of the poor clamping detection mechanism 100 is in the open state and the air pressure in the air passages 82 and 104 is not elevated, so that it is possible to detect that the workpiece W is not correctly clamped, since the pressure switch 84 of the seating sensor 80 dose not become ON. In this case, the workpiece W is in an incompletely clamped state, and sufficient clamping force is not being generated. Since the air supply system of the poor clamping detection mechanism 100 is built in common with the air supply system for the seating sensor 80, accordingly the air supply system becomes simple.

On the other hand, in a case where the workpiece W is clamped by the clamp device. C while disposed in a horizontally oriented attitude, if when the workpiece W was loaded the clamp operation was still performed even in a state with a gap being present between the workpiece W and the workpiece mounting surface 22, then the shift amount of the grip member 2 as it shifts until the workpiece W seats against the seating surfaces 18 becomes great, and since thus, in a similar manner to that described above, the valve mechanism 105 of the poor clamping detection mechanism 100 remains in the open state, accordingly it is possible to detect this poor clamping with the seating sensor 80, in a similar manner to that described above. It should be understood that it is also possible to detect poor clamping in a similar manner to that described above, if clamping is performed in a state in which some foreign body is present squeezed between the workpiece mounting surface 22 and the workpiece W.

If a workpiece W is to be clamped with a plurality of these clamp devices C, and if the positions of the centers of some of the holes H in the workpiece W are slightly deviated due to manufacturing errors in the workpiece W, then when the clamp rods 3 and the grip members 2 are inserted into the holes H, or upon clamping, due to elastic deformation of the scrapers 28 and the O-rings 52, the common axes of the clamp rods 3 and the grip members 2 will come to deviate from the axes of their hydraulic cylinders 4.

However when the clamp devices C are returned to their unclamped states after machining of the workpiece W, then, due to the elastic force of the scrapers 28 and the O-rings 52, the common axes of the clamp rods 3 and the grip members 2 automatically return so that they coincide with the axis of their hydraulic cylinder 4. In this case, since elastic forces are applied and are released at two spots above and below upon the clamp rods 3, accordingly it becomes possible to release the clamp rods 3 smoothly without any play; and since for this reason manual operation is not required in order to perform the task of returning these axes so that they coincide with one another each time that the system goes into the unclamped state, accordingly it is possible to enhance the working efficiency for the task of clamping the workpiece W. Moreover, due to the provision of the O-rings 52, it is possible reliably to ensure smooth sliding shifting of the clamp rods 3 in directions orthogonal to the axial direction, while reliably preventing the ingress of foreign matter such as filings into the sliding portions between the large diameter guard portions 34 of the clamp rods 3 and the medium diameter holes 49 of the tubular piston rods 44.

Now, when the grip member 2 is to be exchanged, this can be performed by executing the following procedure. First, the lower main body member 12 and the upper main body member 11 that is engaged by bolts to the base body member 13 are removed. In this case, although the upper main body member 11 is removed by being shifted upwards, it is possible for this procedure to be performed without the teeth 24a causing any damage to the scraper 28 that is installed to the upper main body member 11, since at this time the scraper 28 is positioned more outwardly in the radial direction than the teeth 24a of the grip member 2.

And, when the upper main body member 11 is to be taken off, since the grip member 2 is split perfectly into four parts, accordingly it is possible to remove each of the divided portions of the grip member 2 in a simple manner, without any interference with the clamp rod 3. And when a new grip member 2 is to be installed, while it is possible to perform the above task in the reverse order, in particular, even when fitting the upper main body member 11, it is possible for this procedure to be performed without the teeth 24a of the grip member 2 that has been newly installed causing any damage to the scraper 28 installed in the upper main body member 11, since the scraper 28 is positioned more outwardly in the radial direction than the teeth 24a of the grip member 2.

Embodiment 2

In the description of this embodiment, to structures that are similar to ones of the clamp device C of the above embodiment, the same reference numerals are appended, and explanation thereof will be omitted, with only the structures that are different being explained. If it is arranged for ribs to be formed around the periphery of the hole H in the workpiece W, then, when the workpiece W has been clamped, the pressurized air ejection hole 81 on the seating surface 18 may not necessarily be blocked by the lower surface of the workpiece W, since the lower surface of the workpiece W is not planar. When in this type of case the function of the seating sensor 80 is deployed, this seating is not detected by the seating sensor 80, even though the clamped state has been attained.

Figure 9:
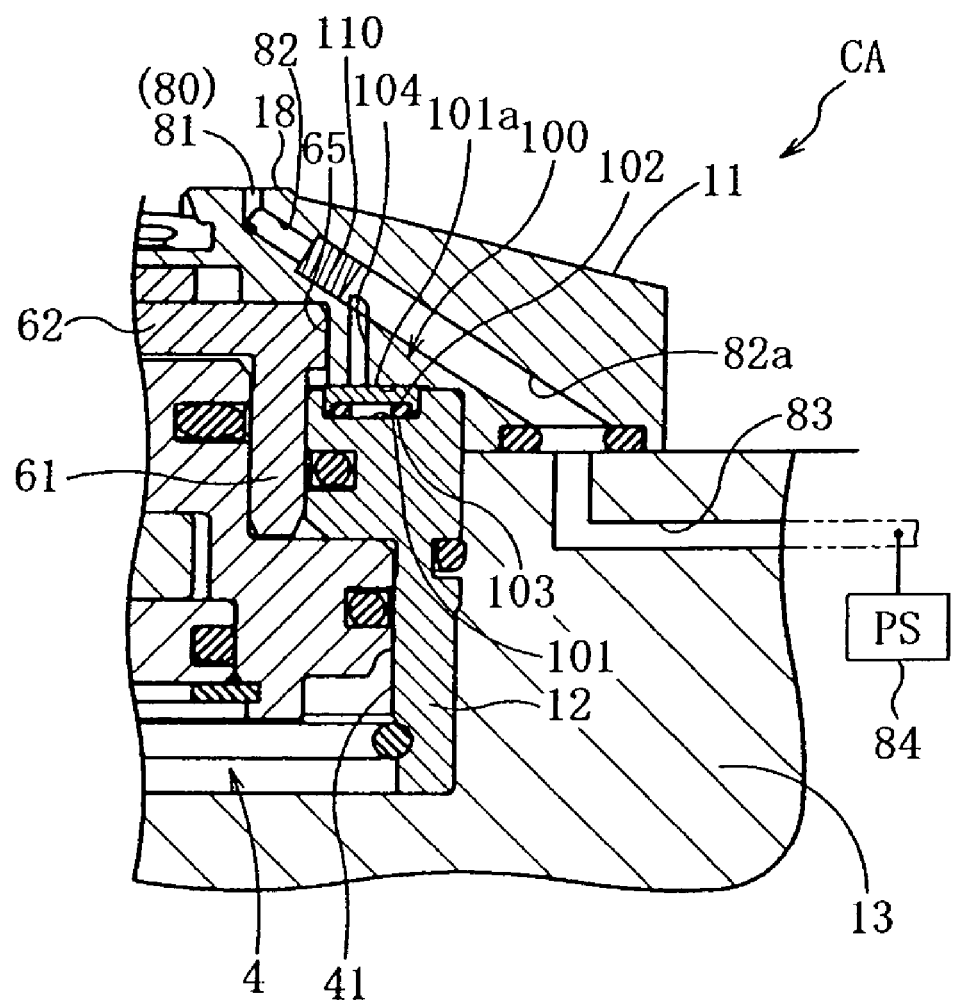
FIG. 9 is a figure corresponding to FIG. 4 of a second embodiment.

Thus, as shown in FIG. 9, with this clamp device CA, the portion of the air passage 82 other than the downstream portion thereof is made as an air passage 82*a* whose diameter is larger than that of the downstream portion, according to requirements, it is arranged to stop the function of the seating sensor 80 by fitting a plug member 110 made from, for example, rubber or synthetic resin into the deepest part of the end portion of this large diameter air passage 82*a*. However, it is still possible to supply pressurized air to the poor clamping detection mechanism 100. It should be understood that according to requirements, such as when the type of the workpiece has changed or the like, it is possible to remove the plug member 110 described above.

Embodiment 3

Figure 10:
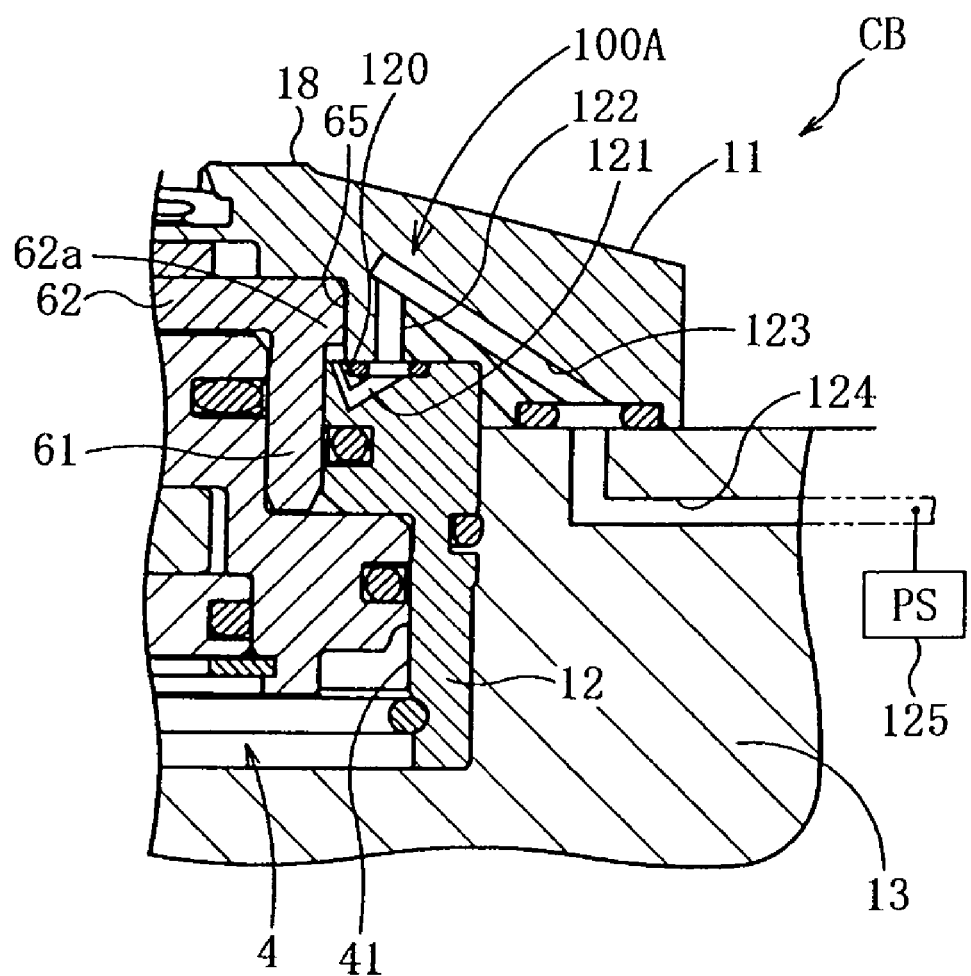
FIG. 10 is a figure corresponding to FIG. 4 of a third embodiment.

In the description of this embodiment, to structures that are similar to ones of the clamp device C of the above embodiment, the same reference numerals are appended, and explanation thereof will be omitted, with only the structures that are different being explained. As shown in FIG. 10, a poor clamping detection mechanism 100A having a structure different from that of the poor clamping detection mechanism 100 is provided to this clamp device CB. In this clamp device CB, the valve mechanism 105 is omitted, and a pressurized air ejection hole 120 opening at a portion of the lower main body member 12 that opposes the engagement guard 62*a* of the annular pressure receiving member 5, and an air passage 121 connected to this pressurized air ejection hole 120, are formed in the upper end portion of the lower main body member 12.

Air passages 122 and 123, that are different from the above air passage 82 for the seating sensor 80 and that are connected to the air passage 121, are formed in the upper main body member 11. An air passage 124 that is connected to the air passage 123 is formed in the base body member 13, with this air passage 124 being connected to a pressurized air supply source; and a pressure switch 125 that detects that the pressure of the pressurized air in the passage 124 has become equal or greater than a predetermined pressure value is also provided.

When the annular pressure receiving member 5 has dropped to its lower limit position due to poor clamping, since the pressurized air ejection hole 120 is closed by the engagement guard 62*a*, accordingly elevation of the pressure of the pressurized air therein is detected by the pressure switch 125, and thus it is possible to detect poor clamping. And, since the valve mechanism 105 is omitted, accordingly the structure of this poor clamping detection mechanism 100A becomes simple.

Embodiment 4

Figure 11:
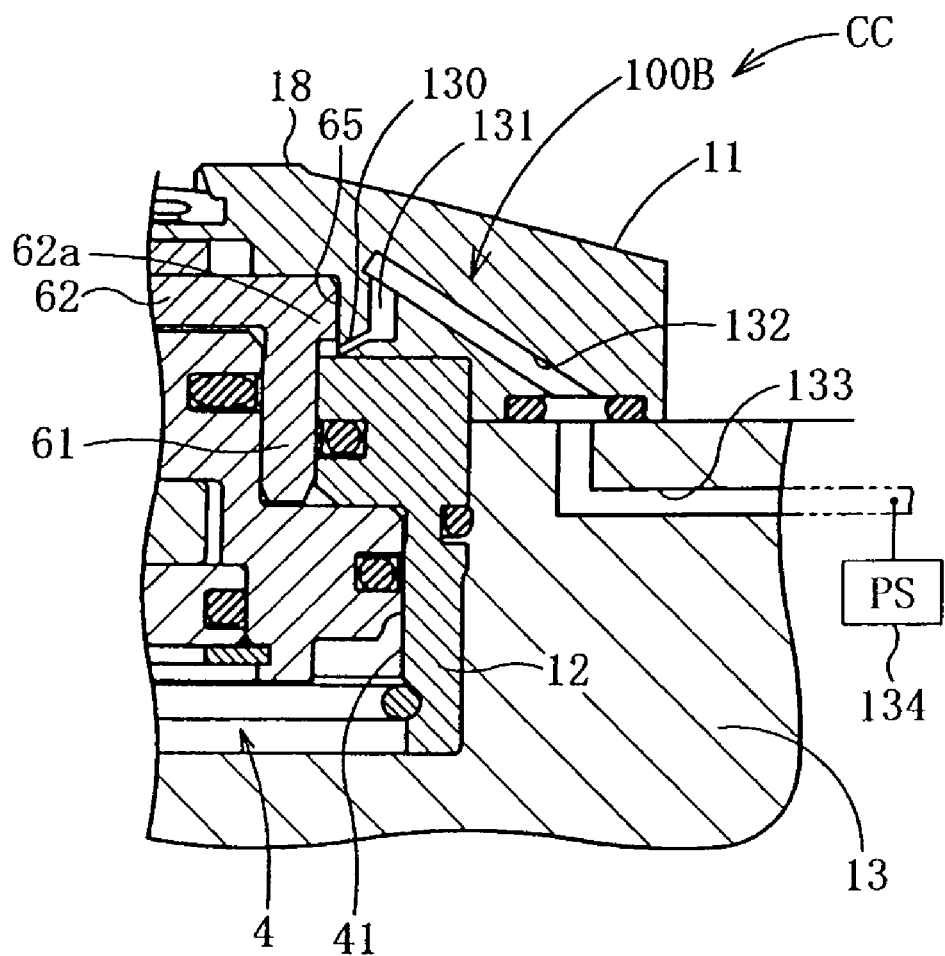
FIG. 11 is a figure corresponding to FIG. 4 of a fourth embodiment.

In the description of this embodiment, to structures that are similar to ones of the clamp device C of the above embodiment, the same reference numerals are appended, and explanation thereof will be omitted, with only the structures that are different being explained. As shown in FIG. 11, a poor clamping detection mechanism 100B having a structure different from that of the poor clamping detection mechanism 100 is provided to this clamp device CC. In this clamp device CC, the valve mechanism 105 is omitted, and, in the upper main body member 11, a pressurized air ejection hole 130 and air passages 131 and 132 are formed at the lower end portion of the circumferential wall portion of the containment hole 65.

Moreover, an air passage 133 that is connected to the air passage 132 is formed in the base body member 13, with this air passage 133 being connected to a pressurized air supply source; and a pressure switch 134 that detects that the pressure of the pressurized air in the passage 133 has become equal or greater than a predetermined pressure value is also provided. When due to poor clamping, since the pressurized air ejection hole 130 is closed by the engagement guard 62*a*, accordingly elevation of the pressure of the pressurized air therein is detected by the pressure switch 134, and thus it is possible to detect poor clamping. And, since the valve mechanism 105 is omitted, accordingly the structure of this poor clamping detection mechanism 100B becomes simple. It should be understood that it would also be acceptable to provide a structure such that the pressurized air ejection hole 130 is closed when the annular pressure receiving member 5 has dropped to a position in the vicinity of its lower limit position.

Embodiment 5

Figure 12:
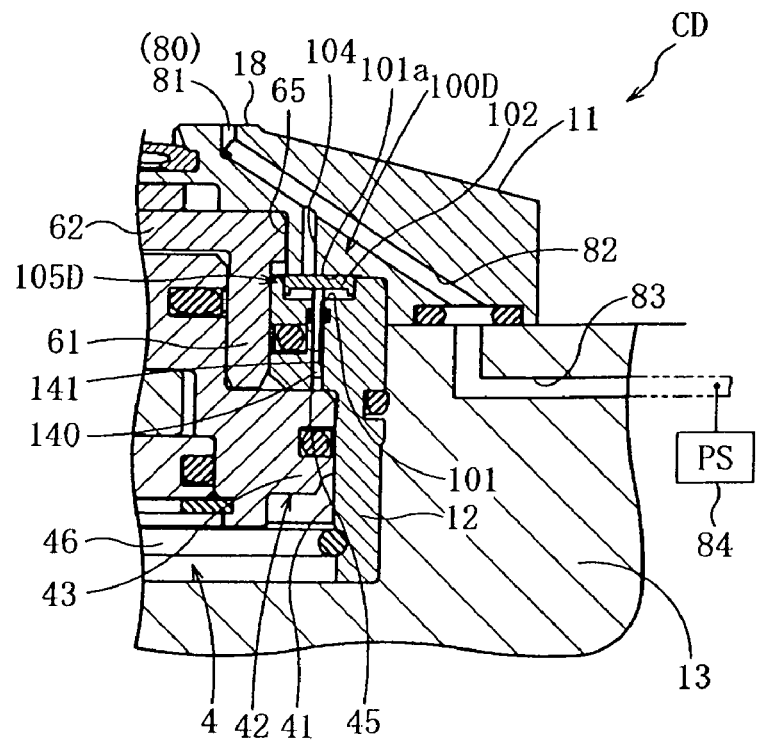
FIG. 12 is a figure corresponding to FIG. 4 of a fifth embodiment.

In the description of this embodiment, to structures that are similar to ones of the clamp device C of the above embodiment, the same reference symbols are appended, and explanation thereof will be omitted, with only the structures that are different being explained. As shown in FIG. 12, a poor clamping detection mechanism 100D having a structure different from that of the poor clamping detection mechanism 100 is provided to this clamp device CD. In this poor clamping detection mechanism 100D, the valve mechanism 105D comprises a valve member 102 that opens and closes the air passage 104, and a rod shaped valve biasing member 140 that is installed in the lower main body member 12 of the clamp main body member 1 so as to be movable, and that biases the valve member 102 towards its position to close the air passage 104 upon receipt of hydraulic pressure supplied to the clamping hydraulic chamber 45 of the hydraulic cylinder 4; and it is arranged for this valve member 102 to be operated to open by being pressed by the engagement guard 62*a* of the annular pressure receiving member 5. This valve member 102 is similar to the one of the first embodiment.

A vertically pierced through hole 141 is formed in the lower portion below the concave circular portion 101 of the lower main body member 12, and the valve biasing member 140 is received in this through hole 141 and slides freely therein in a state of being sealed by an annular seal; moreover, the upper end portion of this valve biasing member 140 is contacted against the valve member 102, while the lower end portion of the valve biasing member 140 is positioned higher than the lower end of the through hole 141. With this clamp device CD, the hydraulic pressure supplied to the hydraulic cylinder 4 is effectively utilized for biasing the valve member 102, so that it is possible reliably to detect poor clamping, and moreover the durability of this valve mechanism 105D can be enhanced.

Embodiment 6

Figure 13:
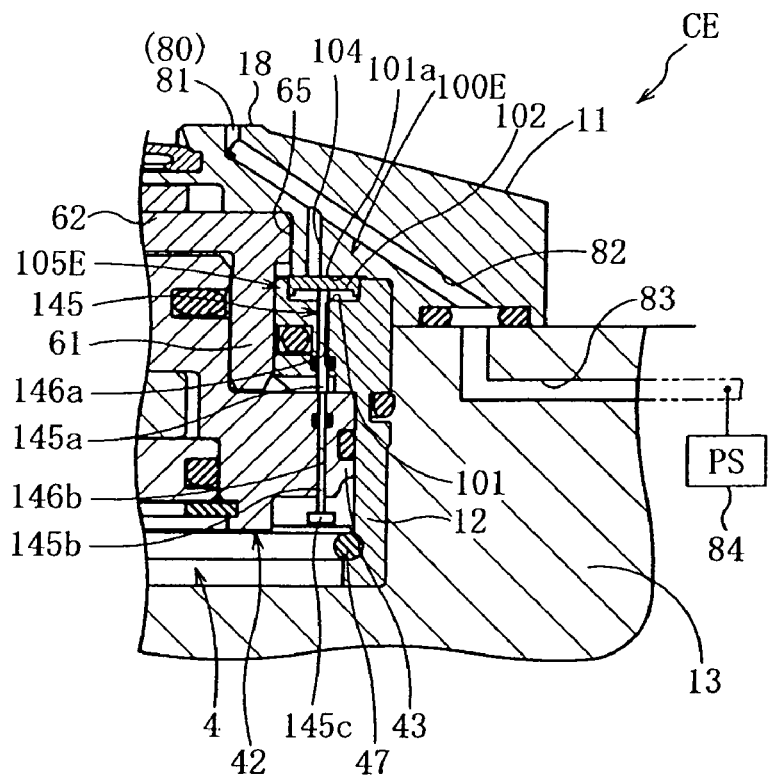
FIG. 13 is a figure corresponding to FIG. 4 of a sixth embodiment.

In the description of this embodiment, to structures that are similar to ones of the clamp device C of the above embodiment, the same reference symbols are appended, and explanation thereof will be omitted, with only the structures that are different being explained. As shown in FIG. 13, a poor clamping detection mechanism 100E having a structure different from that of the poor clamping detection mechanism 100 is provided to this clamp device CE. In this poor clamping detection mechanism 100E, the valve mechanism 105E comprises a valve member 102 that opens and closes the air passage 104, and a rod shaped valve biasing member 145 that passes into the lower main body member 12 of the clamp main body member 1 and the piston portion 43 of the hydraulic cylinder 4 so as to shift freely therein, and that biases the valve member 102 towards its position to close the air passage 104 upon receipt of hydraulic pressure supplied to the clamping hydraulic chamber 45 and the unclamping hydraulic chamber 46 of the hydraulic cylinder 4; and it is arranged for this valve biasing member 145 to be capable of shifting the valve member 102 to its position in which it engages with the piston portion 43 and opens the air passage 104, when the piston portion 43 is shifted to its limit position in the clamping direction. This valve member 102 is similar to the one of the first embodiment.

A vertically pierced through hole 146a of large diameter is formed in the lower main body member 12 below the concave circular portion 101, and a small diameter through hole 146b of diameter smaller than the large diameter through hole 146a and coaxial with the large diameter through hole 146a is formed in the piston portion 43. The upper half portion of the valve biasing member 145 comprises a large diameter shaft portion 145a formed at its upper half portion, a small diameter shaft portion 145b formed at its lower half portion and of diameter smaller than that of the large diameter shaft portion 145a, and an engagement guard portion 145c formed at the lower end portion of the small diameter shaft portion 145b.

The large diameter shaft portion 145a is received in the large diameter through hole 146a and slides freely therein in a state of being sealed by an annular seal, and the upper end portion of this large diameter shaft portion 145a is contacted against the valve member 102, while the small diameter shaft portion 145b is received in the small diameter through hole 146b and slides freely therein in a state of being sealed by an annular seal; and moreover the engagement guard portion 145c is positioned below the piston portion 43, so that this engagement guard portion 145c engages with the piston portion 43 when the piston portion 43 has shifted to its limit position in the clamping direction, and the valve biasing member 145 shifts downward and is removed from the valve member 102, and accordingly the valve member 102 shifts downward due to its own weight and air pressure and the air passage 104 is opened.

It should be understood that, while it is arranged for the valve member 102 to be pressed by the engagement guard 62a of the annular pressure receiving member 5 so that valve opening operation is performed, it would be possible to omit this structure. With this clamp device CE, the hydraulic pressure supplied to the hydraulic cylinder 4 is effectively utilized for biasing the valve member 102, so that it is possible reliably to detect poor clamping, and moreover the durability of this valve mechanism 105E can be enhanced.

Variant examples in which the embodiments described above are partially changed will now be explained.

1) While the air passage 104 of the poor clamping detection mechanism 100 shown in FIG. 4 was connected to the air passage 82 for the seating sensor 80, it would also be acceptable, in a similar manner to FIGS. 10 and 11, to supply pressurized air to the air passage 104 from another air passage than the air passage 82, and to perform detection with a pressure switch similar to the one of FIGS. 10 and 11.

2) Instead of the hydraulic cylinder 4, it would also be possible to provide an air cylinder that operates by pressurized air.

3) It would also be acceptable to omit the seating sensor 80.

4) For a person skilled in the art, it would be possible to implement the above embodiments in various forms by supplementing various changes, and the present invention is to be considered as also including this type of variant implementation.

The present invention may be applied to a clamp device that clamps a workpiece by engaging a grip claw of a grip member into a hole in the workpiece, and by pulling it against a seating surface.

The invention claimed is:

1. A clamp device comprising an annular grip member capable of expanding and shrinking in a radial direction and of being inserted into a hole in a workpiece and of gripping an inner circumferential surface of the hole, a clamp rod having a tapered shaft portion fitted into and engaged with the grip member, a fluid pressure cylinder for driving the grip member and the clamp rod forwards and backwards in an axial direction, and a main body member to which the grip member, the clamp rod, and the fluid pressure cylinder are attached, comprising:
a seating surface formed on the main body member for seating the workpiece;
a poor clamping detection means for detecting poor clamping in a state where the grip member is driven by the fluid pressure cylinder via the clamp rod in the direction parallel to an axis of the clamp rod, and the workpiece is seated on the seating surface, a co-operating member is provided that shifts integrally with the grip member in the direction parallel to the axis of the fluid pressure cylinder; and
the poor clamping detection means comprises a valve mechanism that is actuated by the co-operating member to open when the grip member has been shifted to a grip member lower limit position in the clamping direction or to a position in the vicinity thereof, an air passage that supplies pressurized air to an input side of the valve mechanism, and a pressure switch that detects that a pressure of pressurized air in the air passage is greater than or equal to a predetermined pressure value used for determining whether clamping is poor.

2. A clamp device according to claim 1, comprising providing a seating sensor including a pressurized air ejection hole opening to the seating surface.

3. A clamp device according to claim 1, wherein when the grip member is driven in the clamping direction by the fluid pressure cylinder via the clamp rod, and when the grip member has slipped with respect to the inner circumferential surface of the hole in the workpiece, the grip member shifts to said grip member lower limit position in the clamping direction.

4. A clamp device according to claim 1, comprising providing of a passage portion that branches off from the air passage of the poor clamping detection means, and a seating sensor including a pressurized air ejection hole that communicates with the passage portion and opens to the seating surface.

5. A clamp device according to claim 1, wherein the valve mechanism comprises a valve member that opens and closes the air passage, and an elastic valve biasing member for biasing the valve member to a position to close the air passage; and in that this valve member is pushed by the co-operating member so as to be operated to open.

6. A clamp device according to claim 1, wherein the valve mechanism comprises a valve member that opens and closes the air passage, and a rod shaped valve biasing member that is installed in the main body member so as to be movable, and that, upon receipt of fluid pressure supplied to the fluid pressure cylinder, biases the valve member to a position to close the air passage; and in that this valve member is operated to open by being pushed by the co-operating member.

7. A clamp device according to claim 1, wherein the valve mechanism comprises a valve member that opens and closes the air passage, and a rod shaped valve biasing member that is inserted into a piston portion of the fluid pressure cylinder so as to shift freely therein, and that, upon receipt of fluid pressure supplied to the fluid pressure cylinder, biases the valve member to a position to close the air passage;

and in that the valve biasing member is adapted, when the piston portion has shifted to a piston portion lower limit position in the clamping direction, to be able to be engaged with the piston portion and to shift the valve member to a position to open the air passage.

8. A clamp device according to claim 1, wherein when said valve mechanism is open said pressurized air is unable to achieve said predetermined pressure value, said poor clamping detection means detecting poor clamping when said pressurized air does not achieve said predetermined pressure value.

* * * * *